June 26, 1928. 1,674,812
R. P. WATSON
SWAB FOR DEEP WELLS
Filed March 6, 1926
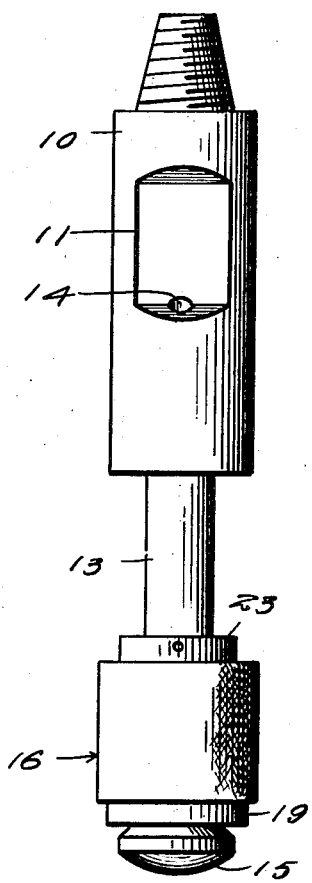
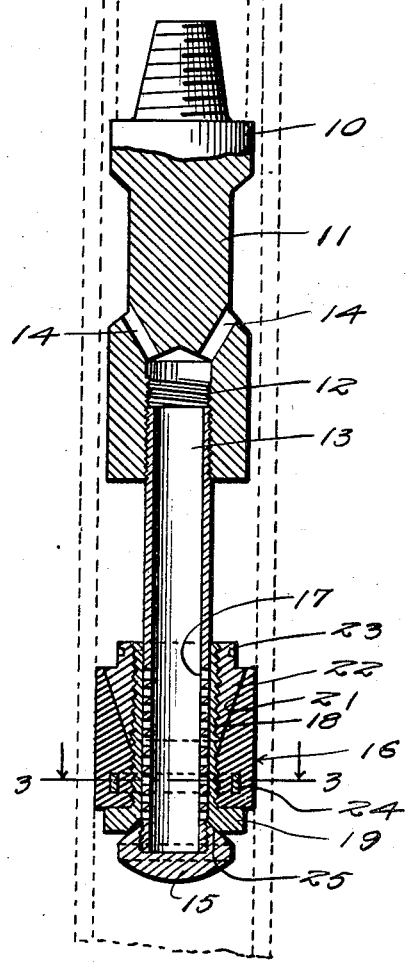
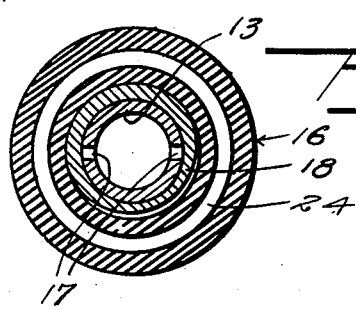
Inventor
R. P. Watson
By Watson E. Coleman
Attorney

UNITED STATES PATENT OFFICE.

RAY P. WATSON, OF RUSSELL, KANSAS.

SWAB FOR DEEP WELLS.

Application filed March 6, 1926. Serial No. 92,882.

This invention relates to swabs for deep wells and has for an important object thereof the provision of a device of this character which may be readily and cheaply produced and in which the swab element is swiveled.

A further object of the invention is to provide a construction in which the swab element is longitudinally movable and in one of its positions permits passage of fluid from one side to the other thereof and in the other of its positions prevents the passage of fluid.

These and other objects I attain by the construction shown in the accompanying drawing, wherein for the purpose of illustration is shown a preferred embodiment of my invention and wherein:—

Figure 1 is a side elevation of a swab constructed in accordance with my invention;

Figure 2 is a vertical sectional view therethrough;

Figure 3 is a section on the line 3—3 of Figure 2.

Referring now more particularly to the drawing, the numeral 10 indicates a sub adapted at its upper end for connection to a rod line and having immediately above the upper end notched sections 11 reducing the sub to permit its engagement by a tool wrench whereby it may be coupled to the rod line. The lower end of the sub is formed with a threaded socket 12 in which is engaged the upper end of a tube 13 and the body of the sub has ports 14 connecting the notches 11 with the socket 12 and accordingly with the interior of the tube 13. The tube 13 has upon its lower end a valve element 15, the face of which is upwardly disposed. This valve element seals the lower end of the tube and provides a limit for downward movement of a swab element, generally designated at 16. Immediately above the valve element, the walls of the tube are provided with a plurality of openings 17 for the passage of fluid.

The swab element includes a threaded sleeve 18 slidable and rotatable upon the tube 13 and having at its lower end an outstanding flange 19 providing a seat for a swab rubber 20. The swab rubber 20 has the upper end of its bore enlarged, as at 21, to provide a conical socket to receive the conical lower end 22 of a nut 23 adjustable upon the sleeve. The lower end of the swab rubber is preferably reinforced by a steel ring 24 cast therein and of less diameter than the flange 19. This ring prevents expansion under pressure of the lower end of the swab rubber to a point where it may pass over the flange 19 and accordingly drop to the bottom of the well.

In the use of the device, the nut 23 is adjusted until the rubber closely fits the wall of the casing C in which the swab is to be employed. The swab is then lowered into the well and the engagement of the swab rubber with the walls will cause the swab element 16 to move upwardly until it engages over the lower end of the sub 10. When in this position, the openings 17 are exposed and liquid within the well may pass through these openings to the interior of the tube 13 and thence through ports 14 to a point above the swab rubber. When the swab has been lowered to the desired extent, the motion is reversed with the result that the valve element 15 comes into engagement with the valve seat 25 formed about the inner edge of the flange 19, sealing the lower end of the swab to prevent the passage of fluid therethrough. If, during this hoisting operation, it is found that the weight of fluid above the swab is greater than can be conveniently supported, a portion of the fluid may be released by lowering the sub 10 for a short time so that a portion of the fluid may drain away.

Since the construction hereinbefore set forth is capable of a certain range of change and modification without materially departing from the spirit of the invention, I do not limit myself to such specific structure except as hereinafter claimed.

I claim:—

In a swabbing device, a sleeve adapted to be slidably mounted, said sleeve having at its lower end an outstanding flange and being threaded at its upper exterior surface, a cone-shaped nut threaded upon the sleeve with its smaller end disposed toward said flange, a swab element of pliable material circumscribing the threaded portion of the sleeve and bearing upon the flange thereof, an annulus embedded in the material of the swab element between the surfaces thereof, said annulus having fixed diametrical dimensions and holding the swab element in contact with the thread of the sleeve, and said swab element being provided at its end above the annulus with a conical pocket which receives the said nut.

In testimony whereof I hereunto affix my signature.

RAY P. WATSON.